United States Patent [19]

Seki et al.

[11] Patent Number: 4,635,466

[45] Date of Patent: Jan. 13, 1987

[54] DIE CUSHION APPARATUS FOR USE IN A PRESS MACHINE

[75] Inventors: Seiji Seki, Kanazawa; Kiyoji Aoshima, Komatsu, both of Japan

[73] Assignee: Kabushiki Kaisha Komatsu Seisakusho, Tokyo, Japan

[21] Appl. No.: 727,458

[22] Filed: Apr. 26, 1985

[30] Foreign Application Priority Data

Apr. 27, 1984 [JP] Japan .............................. 59-61357[U]

[51] Int. Cl.⁴ .............................................. B21J 9/18
[52] U.S. Cl. ................................... 72/453.13; 72/351; 267/119; 100/259
[58] Field of Search .......................... 72/453.13, 351; 267/119; 100/259

[56] References Cited

U.S. PATENT DOCUMENTS

| 2,842,357 | 7/1958 | Williamson | 267/119 |
| 3,456,478 | 7/1969 | Alexander | 72/351 |

FOREIGN PATENT DOCUMENTS

| 616266 | 6/1935 | Fed. Rep. of Germany | 267/119 |
| 1040488 | 10/1958 | Fed. Rep. of Germany | 72/351 |
| 46-25241 | 8/1971 | Japan . | |
| 50-37563 | 10/1975 | Japan . | |
| 53-998 | 3/1978 | Japan . | |
| 2036923 | 7/1980 | United Kingdom | 72/453.13 |

Primary Examiner—Francis S. Husar
Assistant Examiner—David B. Jones
Attorney, Agent, or Firm—Armstrong, Nikaido, Marmelstein & Kubovcik

[57] ABSTRACT

In a die cushion apparatus, a die cushion mechanism for achieving a die cushioning capability as relying upon a preset pneumatic pressure is provided with a hydraulic pressure chamber into which a piston connected to a die cushion pad is fitted, the hydraulic pressure chamber is provided with a hydraulic pressure feed circuit and an exhaust circuit, a relief valve whose relief pressure is controllable is disposed in the exhaust circuit, and relief pressure control means is coupled to the relief valve.

1 Claim, 3 Drawing Figures

DIE CUSHION APPARATUS FOR USE IN A PRESS MACHINE

BACKGROUND OF THE INVENTION

1. Field of the Invention

The present invention relates to a die cushion apparatus in a press machine for press-shaping a metal sheet.

2. Description of the Prior Art

In the press machine provided with a die cushion apparatus in the prior art, since a sheet material (work) was kept stationary and an upper die collided against this work at a high speed $V_1$ upon commencement of a shaping operation, a vibration and a noise were caused. Accordingly, it has been required to resolve at an early date the problem of the vibration and the noise which are increasing in accordance with speed-up of the press machine.

Even with respect to the die cushioning capability, the die cushion apparatus in tne prior art could not have its capability fully controlled due to the fact that it relied upon a pneumatic pressure only, and this served as a neck for shortening a try period of a metal mold and for allowing to complex a metal mold.

Although the required capability of the die cushion apparatus during the working process is necessary upon commencement, it is desired to reduced the capability at the midway of the working process, or it is desirable to employ a variable die cushion system in which the capability is increased just prior to finishment of the working. However, the die cushion apparatus in the prior art had only a constant capability, and could not meet the requirement.

The present invention has been worked out under the above-mentioned situation of the prior art.

SUMMARY OF THE INVENTION

It is therefore one object of the present invention to provide a die cushion apparatus in which not only a die cushioning capability can be precisely controlled but also a die cushioning capability during a working process can be variably controlled.

According to one feature of the present invention, there is provided a die cushion apparatus comprising a die cushion mechanism for achieving a die cushioning capability as relying upon a preset pneumatic pressure, a hydraulic pressure chamber provided in the die cushion mechanism with a piston connected to a die cushion pad fitted into the hydraulic pressure chamber, a hydraulic pressure feed circuit and an exhaust circuit both associated with the hydraulic pressure chamber, a relief valve disposed in the exhaust circuit, the relief pressure of the relief valve being controllable, and relief pressure control means coupled to the relief valve.

According to the present invention, the hydraulic pressure in the hydraulic pressure chamber can be controlled by controlling the relief pressure with the relief pressure control means, thereby the die cushioning capability can be precisely controlled, and also thereby the die cushioning capability during a working process can be variably controlled.

The above-mentioned and other objects, features and advantages of the present invention will become more apparent by reference to the following description of one preferred embodiment of the invention taken in conjunction with the accompanying drawings.

DESCRIPTION OF THE PREFERRED EMBODIMENT

Figure 1:
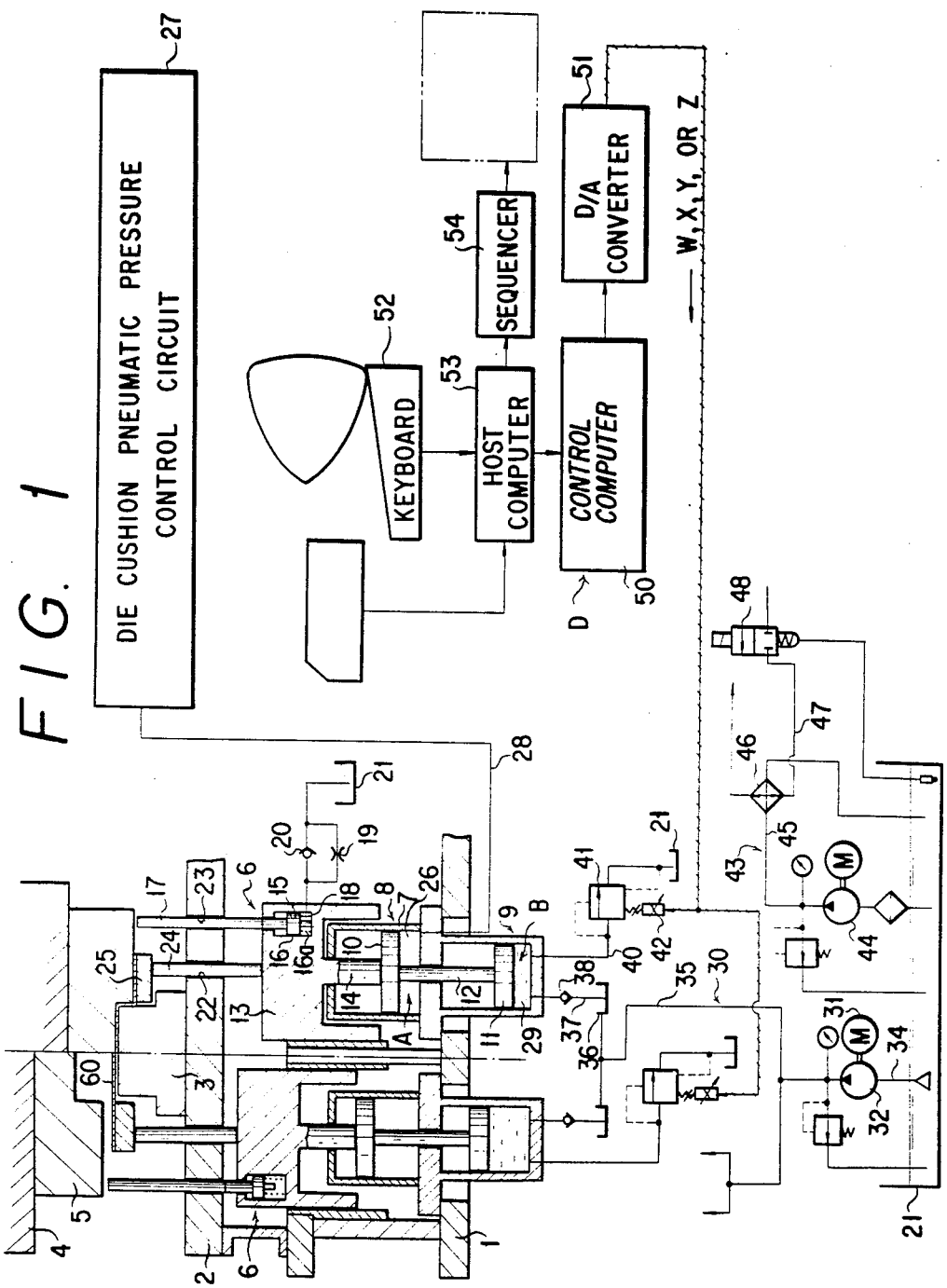
FIG. 1 is a schematic view showing a construction of one preferred embodiment of the present invention.

Now one preferred embodiment of the present invention will be described with reference to the accompanying drawings. FIG. 1 is a schematic view showing a construction of a 4-pad 4-cylinder independent type die cushion apparatus.

Reference numeral 1 designates a base of a machine main body, a bolster 2 is provided on the machine main body base 1, and the bolster 2 is provided with a lower die 3. Reference numeral 4 designates a slide, and numeral 5 designates an upper die.

On the machine main body base 1 are disposed four die cushion mechanisms 6 which are independent of each other. Each die cushion mechanism 6 is provided with a cylinder device 7, and the cylinder device 7 mounted on the base has an upper-side cylinder section 8 and a lower-side cylinder section 9. An upper-side piston 10 is fitted in the upper-side cylinder section 8, a lower-side piston 11 is fitted in the lower-side cylinder section 9, and the upper-side and lower-side pistons 10 and 11 are connected to each other as a dual piston with a connecting rod 12. Reference numeral 13 designates a first die cushion pad, and this first die cushion pad 13 is connected to the upper-side piston 10 via a piston rod 14. A cylinder section 15 is provided in the first die cushion pad 13, a piston 16 is fitted in the cylinder section 15, and a pilot pin 17 is connected to the piston 16. A spring 16a is interposed between the bottom of the cylinder section 15 and the piston 16, and a hydraulic pressure chamber 18 in this cylinder section 15 communicates with a tank 21 via a choke 19 and a check valve 20 which are disposed in parallel to each other. The above-described bolster 2 is provided with a hole 22 for a cushion pin and a hole 23 for the pilot pin 17, and pilot pin 17 slidably penetrates through the pilot pin hole 23 to project above the bolster 2, also a cushion pin 24 slidably penetrates through the cushion pin hole 22, a second die cushion pad 25 for contacting the upper die is mounted to the top end portion of this cushion pin 24, and the bottom end portion of the cushion pin 24 butts against the upper surface of the first die cushion pad 13.

To the lower chamber 26, that is, a pneumatic pressure chamber A of the above-described upper-side cylinder section 8 is connected a pneumatic pressure feed piping 28 that is led from a die cushion pneumatic pressure control circuit 27.

On the other hand, the lower chamber 29 of the lower-side cylinder section 9 is formed as a hydraulic chamber B, and this lower chamber 29 is connected to a hydraulic pressure feed circuit 30.

The hydraulic pressure feed circuit 30 is provided with a pump 32 which is rotationally driven by a motor 31, and the suction side of the pump 32 communicates with the tank 21 via a suction pipe 34. The delivery side of the pump 32 communicates with a tank 36 via a delivery side piping 35. The tank 36 communicates with the above-described lower chamber 29 via a feed piping 37, and a check valve 38 is disposed in this piping 37. The lower chamber 29 communicates with the tank 21 via an exhaust circuit 40, and a relief valve 41 is disposed in this exhaust circuit. The relief valve 41 includes a preset spring control section 42. Reference numeral 43 designates an oil cooling circuit, which is provided with a pump 44, a heat exchanger 46 is provided in a delivery side piping 45 of the pump 44, a coolant water piping 47 is provided on the low temperature side of this heat exchanger 46, and a switching valve 48 is provided in this coolant water piping 47.

Reference numeral 50 designates a computer for control purpose, on the output side of this control computer 50 serving as relief pressure control means D is provided a D/A-converter 51, and the output (analog signal) W,X,Y or Z from this D/A-converter 51 is applied to the input of the preset spring control section 42.

Since the die cushion mechanisms 6 are provided four independently of each other, the remaining three of the outputs W,X,Y and Z of the control computer 50 are adapted to be applied to the inputs of the preset spring control sections 42 of the relief valves 41 of the other three die cushion mechanisms 6.

Reference numeral 52 designates a keyboard, numeral 53 designates a host computer numeral 54 designates a sequencer, and these components achieve other controls such as automatic sequencing, positioning, bar width adjustment, slide adjustment, etc.

Figure 2:
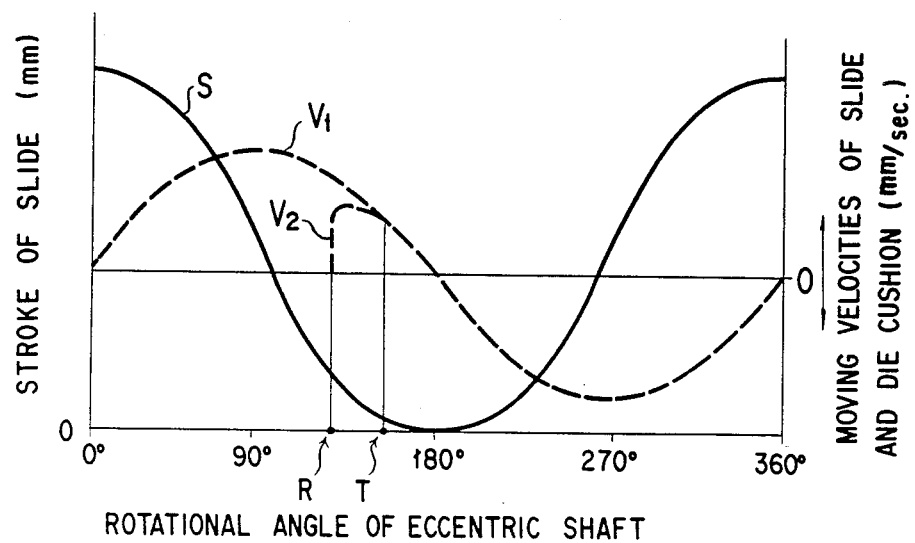
FIG. 2 is a diagram showing a stroke of a slide and moving velocities of the slide and the die cushion in the die cushion apparatus according to the present invention as functions of a rotational angle of an eccentric shaft in the apparatus.

The diagram shown in FIG. 2 represents a stroke of a slide and moving velocities of a slide and a die cushion as functions of a rotational angle of an eccentric shaft in a press machine, curve S representing a slide stroke, curve $V_1$ representing a slide velocity, and curve $V_2$ representing a die cushion velocity. In addition, reference character R represents the time point when the upper die 5 and the pilot pin 17 are brought into contact, and reference character T represents the time point when the upper die is brought into contact with a work and starts working. In addition, a die cushion capability of the die cushion apparatus according to the present invention is diagramatically represented in FIG. 3.

Now description will be made on the operation of the illustrated die cushion apparatus. With a sheet material 60 placed on the lower die cushion pad 25, the slide 4 is lowered to lower the upper die 5. The upper die 5, at first, comes into contact with the pilot pin 17, resulting in lowering of this pilot pin 17. The pilot pin 17 is lowered according to the velocity curve denoted by $V_2$ in FIG. 2, and soon it takes the same velocity as that of the upper die (curve $V_1$). Due to the lowering of the pilot pin 17, the piston 15 connected thereto would compress the oil in the hydraulic chamber 18, and this oil is exhausted through the choke 19 to the tank 21. Owing to the restriction of the flow rate of the oil by means of the choke 19, the impact caused upon contact of the upper die 5 with the pilot pin 17 can be mitigated. According to the lowering of the pilot pin 17, the die cushion pad 13 is also lowered, resulting in acceleration of the die cushion pad 13, and thus the velocity difference between the die cushion die and the upper die 5 is reduced. At the time point indicated by reference character T in FIG. 2, the upper die 5 comes into contact with the sheet material 60 to be press-shaped and starts working.

Figure 3:
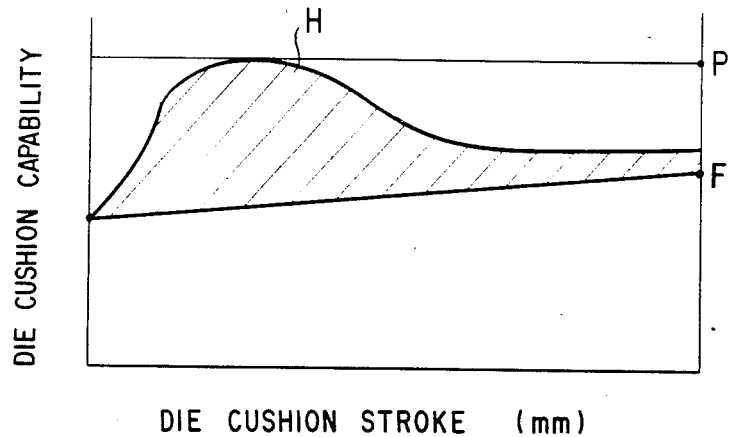
FIG. 3 is a diagram showing a die cushioning capability as a function of a die cushion stroke.

After the working has been commenced, the die cushion pad 13 is pushed downwards via the cushion pin 24, and so, the upper-side piston 10 and the lower-side piston 11 connected to the die cushion pad 13 are lowered. The air in the pneumatic pressure chamber A is compressed by the lowering of the upper-side piston 10, and the die cushioning capability F achieved by this setting of a pneumatic pressure is about 10–80% of the total die cushioning capability as shown in FIG. 3.

Also, the oil in the hydraulic pressure chamber B is compressed by the lowering of the lower-side piston 11, and this oil is exhausted to the tank 21 through the relief valve 41. The relief pressure of such a relief valve 41 is controlled by the die cushion control computer 50. The controllable range of the die cushioning capability relying upon the relief valve 41 is indicated by a hatched area in FIG. 3. In FIG. 3, reference character P represents the maximum capability.

Since the die cushion apparatus according to the present invention is constructed and operates in the above-described manner, the relief pressure is controlled by the relief pressure control means D to control the hydraulic pressure in the hydraulic pressure chamber B, and thereby not only the die cushioning capability can be precisely controlled, but also the die cushioning capability during a working process can be variably controlled.

Since many changes and modifications can be made in the above-described construction without departing from the spirit of the present invention, it is intended that all matter contained in the above description and illustrated in the accompanying drawings shall be interpreted to be illustrative and not as a limitation to the scope of the invention.

What is claimed is:

1. A die cushion apparatus for use in a press machine, comprising:
    (I) a die cushion mechanism for achieving a die cushioning capability, said die cushion mechanism including a plurality of cylinder devices mounted on a base of a machine body, a plurality of first die cushion pads each mounted on one of said cylinder devices, respectively, and a plurality of cushion pins each interposed between said first die cushion pads and one of a plurality of second cushion pads for contacting an upper die, respectively, each of said cylinder devices comprising:
     (a) an upper-side cylinder section,
     (b) a lower-side cylinder section connected to said upper-side cylinder section,
     (c) a dual piston having a piston rod connected to each of said first die cushion pads and having at opposite sides thereof two piston heads which are connected with each other by a connecting rod and are fitted into said upper-side cylinder section and said lower-side cylinder section, respectively,
     (d) a pneumatic pressure chamber defined by said upper-side cylinder section and one of said piston heads and connected to a die cushion pneumatic pressure control circuit, and
     (e) a hydraulic pressure chamber defined by said lower-side cylinder section and the other piston head and connected through a check valve to a hydraulic pressure feed circuit;
    (II) means for relieving a shock caused at the contact of the upper die and a sheet material to be press-shaped, each of said relieving means comprising:
     (a) a cylinder section formed in said first die cushion pad, (b) a piston fitted into said cylinder section and connected to a pilot pin interposed between said upper die and said first die cushion pad, and
(c) a hydraulic pressure chamber defined by said cylinder section and said piston and connected through a check valve and a choke to a hydraulic tank; and (III) means for varying the die cushioning capability, each comprising:

(a) an exhaust circuit connected between said hydraulic pressure chamber of said die cushion mechanism and said hydraulic tank,
(b) a relief valve provided in said exhaust circuit and having a preset spring control section, and
(c) relief pressure control means for said relief valve, said relief pressure control means being connected to said preset spring control section and having a computer for control purpose.

* * * * *